United States Patent
Dresel

(10) Patent No.: US 7,495,773 B2
(45) Date of Patent: Feb. 24, 2009

(54) IN SITU DETERMINATION OF PIXEL MAPPING IN INTERFEROMETRY

(75) Inventor: Thomas Dresel, Nuremberg (DE)

(73) Assignee: Zygo Corporation, Middlefield, CT (US)

( * ) Notice: Subject to any disclaimer, the term of this patent is extended or adjusted under 35 U.S.C. 154(b) by 119 days.

(21) Appl. No.: 11/361,181

(22) Filed: Feb. 24, 2006

(65) Prior Publication Data

US 2007/0201035 A1    Aug. 30, 2007

(51) Int. Cl.
*G01B 11/02* (2006.01)

(52) U.S. Cl. .................................................. 356/512

(58) Field of Classification Search ......... 356/511–514, 356/489, 495
See application file for complete search history.

(56) References Cited

U.S. PATENT DOCUMENTS 5,548,403 A * 8/1996 Sommargren ............... 356/477
6,714,307 B2 * 3/2004 De Groot et al. ............ 356/512
2003/0137671 A1 * 7/2003 De Groot et al. ............ 356/512

OTHER PUBLICATIONS

Written Opinion of the International Searching Authority in International Patent Application PCT/US2006/48419 Mailed on Feb. 25, 2008.

* cited by examiner

*Primary Examiner*—Tarifur Chowdhury
*Assistant Examiner*—Jonathon D. Cook
(74) *Attorney, Agent, or Firm*—Francis J. Caufield

(57) ABSTRACT

Interferometric methods and apparatus by which the map between pixel positions and corresponding part locations are determined in situ. The part under test, which is assumed to be a rigid body, is precisely moved from a base position to at least one other position in one to six degrees of freedom in three-dimensional space. Then, the actual displacements are obtained. The base position is defined as the position with the smallest fringe density. Measurements for the base and all subsequent positions are stored. After having collected at least one measurement for each degree of freedom under consideration, the part coordinates are calculated using the differences of the various phase maps with respect to the base position. The part coordinates are then correlated with the pixel coordinates and stored.

20 Claims, 5 Drawing Sheets

IN SITU DETERMINATION OF PIXEL MAPPING IN INTERFEROMETRY

FIELD OF THE INVENTION

In general, this invention relates to the field of interferometry and, in particular, to methods and apparatus for in situ determination of the mapping of pixels in a detector array on to their corresponding locations of the surface of a part to be measured.

BACKGROUND OF THE INVENTION

In the field of high precision sphere and asphere measurements, contemporary phase evaluation techniques yield surface error maps with sub-nm uncertainties. The measurand in these cases is the height deviation between the part under test and the ideal geometry measured along the surface normal.

The result of such measurements is usually delivered as a two-dimensional height map sampled on a regular grid. Initially, an interferometer gives the result in pixel coordinates of the acquisition camera. For visually assessing the quality of the surface under test, it is possible to leave the result in pixel coordinates and this is very often done. However, if the result is to be used as a feedback for the manufacturing process, it becomes necessary to present the height information in a form that allows for precisely associating each height sample with the affiliated location on the surface. Then, for instance, a polishing machine can be programmed to remove the excessive height from each point precisely.

Also for an exact numerical analysis of the figure errors of the part, it is often not admissible to leave the height results in pixel coordinates. Wavefront generators and imaging optics used for illuminating and imaging the part usually introduce a significant amount of distortion. For instance, consider a part with a large form deviation that is to be decomposed into Zernike coefficients. For this, it is necessary to know and compensate for the distortion or otherwise the Zernike decomposition will be inaccurate. A pure spherical aberration on the part could, for instance, crosstalk into other Zernike components simply because the computation grid is assumed to be equally spaced but in reality is a distorted projection of a regular grid on the part.

Therefore, together with the height values, the location of each pixel of the surface map on the surface under test is required. This information is referred to as the pixel mapping of the instrument.

This mapping is influenced by the geometry of the interferometer cavity as well as the optical imaging system that is used for relaying the part under test onto the instrument's camera.

Very often, the pixel mapping is known only implicitly, that is, by determining the location in pixel coordinates of a certain feature on the part whose physical dimension is known. This can, for instance, be the known diameter of an aperture that is mounted on top of the surface under test which can be found in image coordinates by image processing. Then a linear relationship of the pixel mapping is assumed to obtain the coordinate mapping over the full surface. This method can not account for a possible distortion of the imaging system.

Another possibility is to obtain the pixel mapping from a computer-modeled version of the imaging system. This approach has the advantage that effects like distortion or other aberrations of the imaging system can be taken into account. For this to work, highly accurate information about the various optical components in the system is necessary. The model approach can be combined with the image processing method of finding a metrically known feature on the part as described above.

In high precision sphere and asphere metrology, use is often made of additional calibration methods to measure the pixel mapping, including any possible distortion. This can be done, for example, by using a special test artifact as an object with clearly detectable features to characterize the coordinate mapping of the imaging optics. In certain cases, it is necessary to repeat such a coordinate calibration for various focus settings of the interferometer.

In general, such a coordinate calibration is a costly and tedious additional effort in high precision optical metrology.

Knowing the exact coordinate mapping between a camera and the part under test in ultra-precise asphere metrology, which uses a very high accuracy manipulator stage, requires knowledge of the coordinate mapping on two occasions: first; in the calibration of the reference surface, and second, during the alignment of the surface under test.

In ultra high precision metrology, it is known that the manipulator stage allows moving the part in 6 degrees of freedom with nm control over the rigid body motion of the part under test in three-dimensional space. As will be described, the coordinate mapping between the camera pixels and the part under test can be determined directly from a set of phase measurements in conjunction with use of the manipulator stage.

Accordingly, a primary object of the present invention is to provide methods and apparatus for the in-situ determination of mapping from pixel coordinates onto object coordinates and vice versa by using a manipulator stage for controlling the part position in the interferometer cavity and making a few additional phase measurements at various part positions.

Other objects of the invention will, in part, be obvious and will, in part, appear hereinafter when the detailed description is read with reference to the drawings.

SUMMARY OF THE INVENTION

The present invention relates to interferometric methods and apparatus by which the map between pixel positions and corresponding part locations are determined in situ. The part under test, which is assumed to be a rigid body, is moved in one to six degrees of freedom in three-dimensional space. Applying a terminology commonly used in Mechatronics, the device that moves the part around and measures its position in all degrees of freedom is referred to as a manipulator stage, or simply the part manipulator.

It is preferable and more optimal when the manipulator incorporates measurement or feedback loops, that is, it both provides the motion and delivers sensor values for the actually reached position in space. Then, the actual displacements $\delta x$, $\delta y$, $\delta z$, $\delta rx$, $\delta ry$, and $\delta rz$ are obtained from a transformation of the external sensor data. Here $\delta rx$, $\delta ry$, and $\delta rz$ stand for small angular displacements about the x, y, and z-axis, respectively. If external sensor data are not available, it is also possible to determine these values from the phase maps themselves.

For determining the coordinates, the part under test is measured in at least 2 different positions (cf. case study A). First, the part is measured in a base position, which is usually defined as the position with the smallest fringe density. Then the part is moved in space using the manipulator acting on one degree of freedom at a time. The part is re-measured there and the result is stored. After having collected at least one measurement for each degree of freedom under consideration, the part coordinates are calculated using the differences of the various phase maps with respect to the base position.

A variety of interferometers and manipulator stages can be used to carry out the methodology of the invention through the use of a suitably programmed computer provided with software to carry out the method steps. Fizeau interferometers are preferred with phase measurements carried out using phase shifting techniques.

BRIEF DESCRIPTION OF THE DRAWINGS

The structure, operation, and methodology of the invention, together with other objects and advantages thereof, may best be understood by reading the detailed description in conjunction with the drawings in which each part has an assigned numeral that identifies it wherever it appears in the various drawings and wherein.

DETAILED DESCRIPTION

In the following, the principles of the invention are described by way of examples starting from the simplest implementation involving only one degree of freedom and then going on to the more general use cases involving several degrees of freedom simultaneously.

EXAMPLE A

Spherical Cavity, z-Motion Only

In principle, the method can be applied to many kinds of interferometers such as Fizeau-Interferometers, Mirau-Interferometers, Twyman-Green-Interferometers, Michelson-Interferometers, Linnik-Interferometers, Grazing incidence interferometers, Shearing interferometers, and so forth. In the following, a first version of the method is described using the special case of a Fizeau-interferometer. The Fizeau case is the easiest case because there are no additional optics between the reference and the object surface in a Fizeau configuration. Because of this, the Fizeau type is probably the most widely used interferometer in the optics industry.

Figure 1:
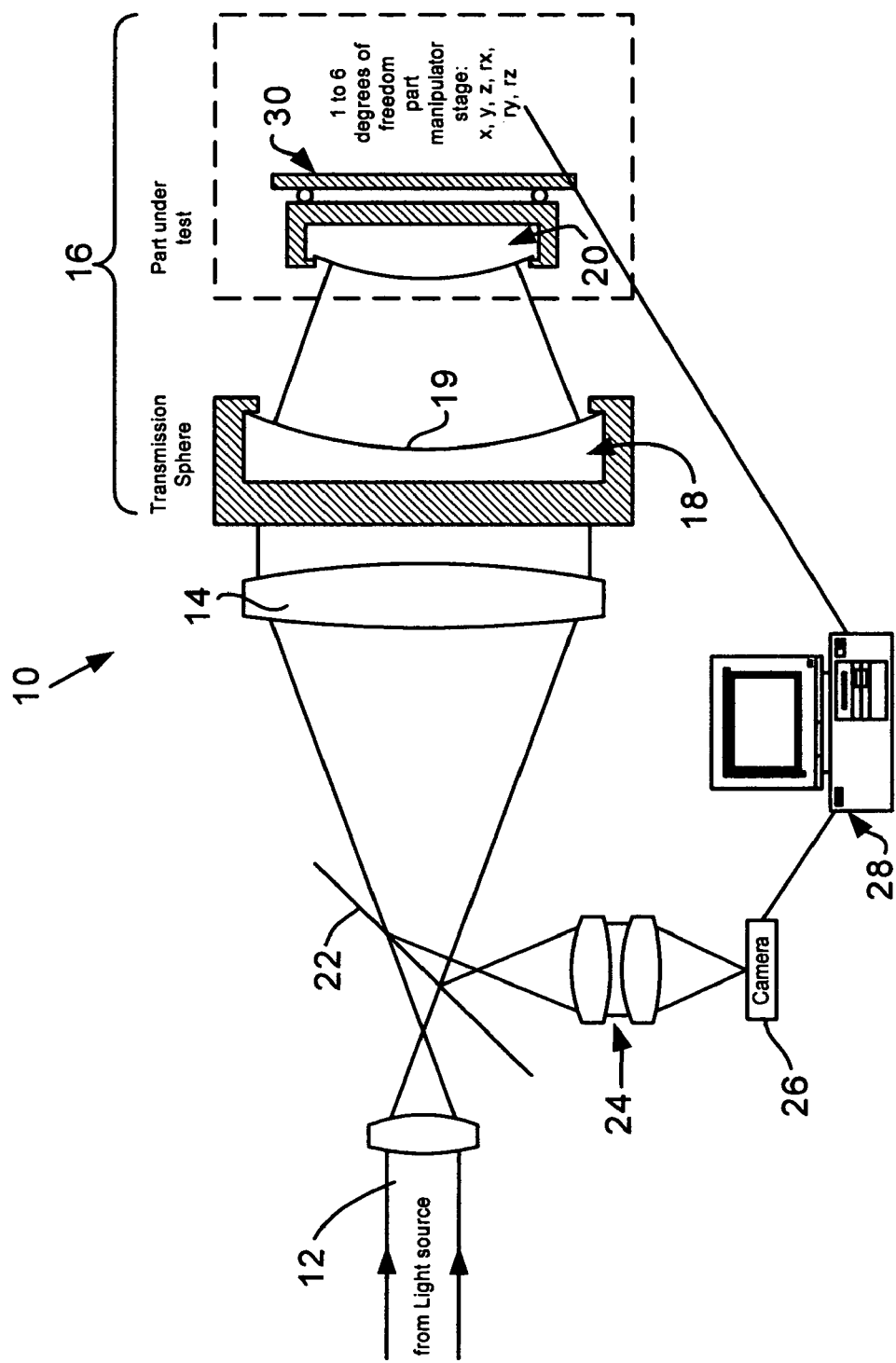
FIG. 1 is a diagrammatic view of a Fizeau interferometer with the part mounted on a manipulator stage for changing and measuring the part position with respect to a reference surface.

In FIG. 1, a typical Fizeau setup is shown generally designated at 10. A beam 12 coming from a light source is expanded by a collimation system 14 and then illuminates a spherical Fizeau cavity 16. The light is partially reflected at the last surface 19 of element comprising a transmission sphere 18 (which may be a quite complex lens system by itself) and also at the part 20 under test. The light travels back to a beamsplitter 22, gets reflected there and passes to an imaging system 24, which sharply focuses the part under test from an intermediate plane in the cavity onto a computer controlled camera 26. The interference pattern on the camera 26 is stored and analyzed by image processing. A computer 28 is provided with suitable software for implementing the various method steps to be described, conduct housekeeping duties, and provide a graphical user interface (GUI) for issuing commands and displaying results. The computer 28 also controls the part position by commanding positions to a highly precise part manipulator stage 30. The cavity 16 is preferably measured using phase shifting interferometry.

For this, the transmission sphere 18 usually provides a phase-shifter which moves the reference surface 19, or the whole transmission sphere 18, by a small amount. This phase-shifter is not shown in the figure because it is well known and is considered an integral part of the phase measuring capability of the interferometer.

The invention makes use of changing the position of the part 20 under test with respect to the reference surface 19 by commanding positions to the part manipulator stage 30. Here, the manipulator stage 30 is a mechanical stage for addressing part positions in at least 1, but up to 6 degrees of freedom, together with external sensors that provide feedback such that the actual position of the part 20 in space is known at any time. The manipulator stage 30 may or may not have an internal control loop using the sensor feedback to maintain a certain position. This is a detail of the manipulator stage 20, but the method can already work when it accurately knows the position of the part 20 by using the sensors. However, the method becomes easier when an additional control loop in the manipulator is present.

Figure 2:
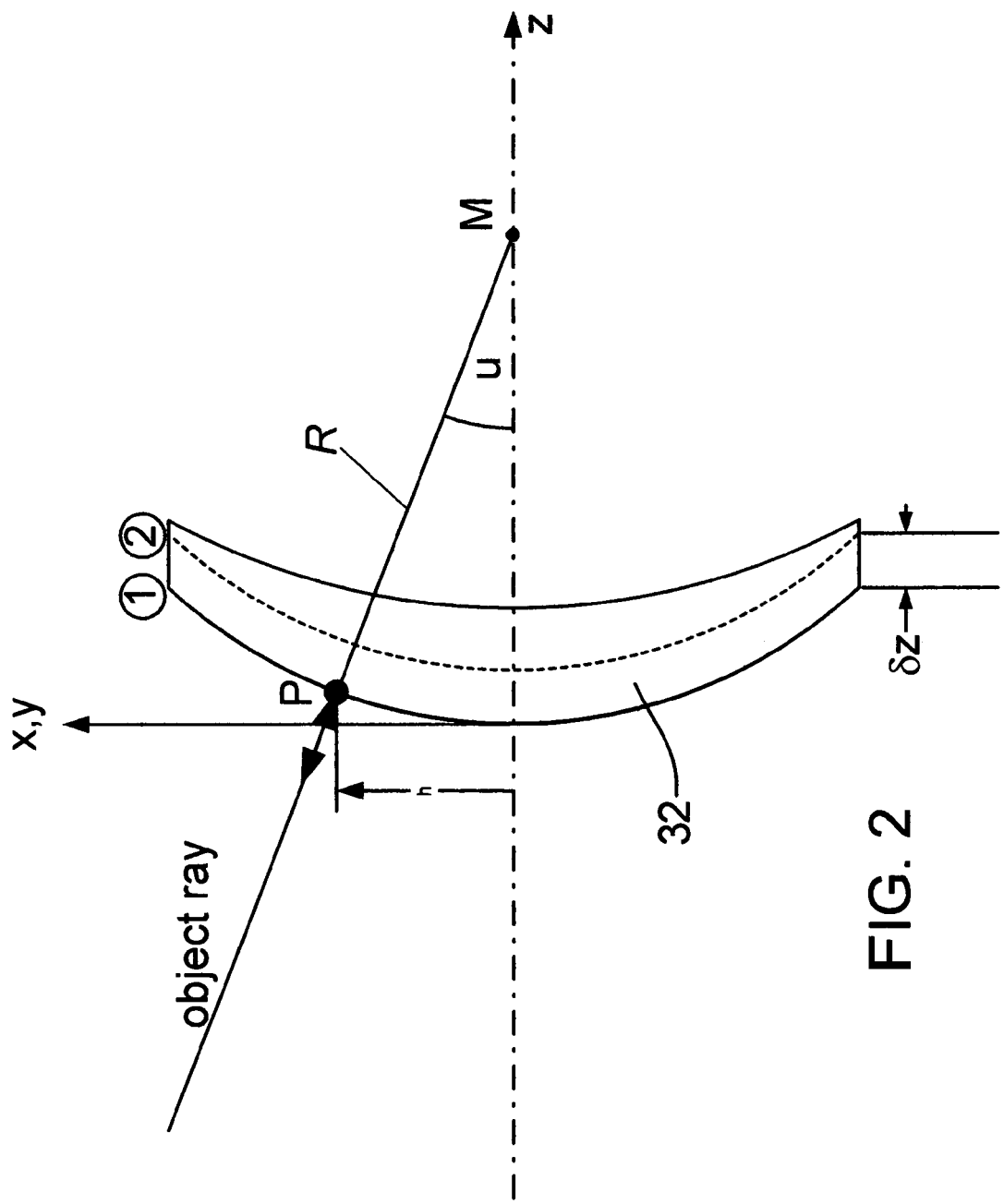
FIG. 2 is a diagram illustrating a simple measurement geometry and its various relationships of parameters useful in practicing a method of the invention.

For describing the method in its simplest form, the part under test is moved only axially, that is, along the z-axis (only one degree of freedom is used). For understanding the optical effect on the interference, reference is now made to the geometry outlined in FIG. 2. As seen there, a spherical or mildly aspherical test object 32 is measured interferometrically in the Fizeau. Shown is the measurement at one particular location P on the part. A ray coming from the interferometer hits P normal to the surface, is reflected, and goes back to the interferometer where it is compared with the reference ray, which is not shown but as described in connection with the description of FIG. 1. The phase difference between the object and the reference ray is measured with high precision using modern phase measuring techniques, such as phase shifting or wavelength shifting computerized interferometry carried out in a well known manner with and under the control of computer 28.

By moving the part along the optical axis, the part is measured in two cavity configurations labeled 1 and 2 in the figure. The z-displacement between the two states is called δz.

To first order approximation, the phase change at P is mathematically given by:

$$\Delta\Phi = 2\ \delta z \cos u \quad (Eq.\ 1)$$

Therefore, the phase difference between the two configurations can be used to measure cos u for each point in the field of view, provided the displacement δz is known externally (using the manipulator sensors). Using modern cameras and phase evaluation techniques, it is possible to measure this quantity for the full field of view in parallel. If it is known that an object point with u=0 is in the field of view one can simply take the maximum value of ΔΦ, where cos u=1, to determine δz first and then use the full phase maps to obtain cos u for all pixels, where cos u may be thought of as the direction cosine from any point P in the base position to a corresponding known pixel position. In this case the reading of an external sensor measuring the z displacement is not needed.

Note that by calculating the phase change between the two configurations, the part under test and also the reference surface contribution fall out of the measurement. This is not exactly true because there is a very small shear of the rays at the surfaces but it is true to first order.

Once cos u is known for all pixels in the field of view, the numerical aperture is determined from sin u from the following trigonometric identity:

$$\sin u = \sqrt{1-\cos^2 u} \quad \text{(Eq. 2)}$$

Provided the radius of the surface under test R with center M is known with sufficient accuracy (typically a relative accuracy of 1e-2 to 1e-4 will be good enough, depending on the accuracy requirements of the application), the lateral height h on the part under test is readily determined from the following:

$$h = R \sin u \quad \text{(Eq. 3)}$$

It is to be noted that this value has now been obtained directly in part coordinates from the difference of two phase maps. It is not necessary here to know anything about parameters of the imaging optics of the instrument, such as paraxial magnification, focal lengths, and so on.

Figure 3:
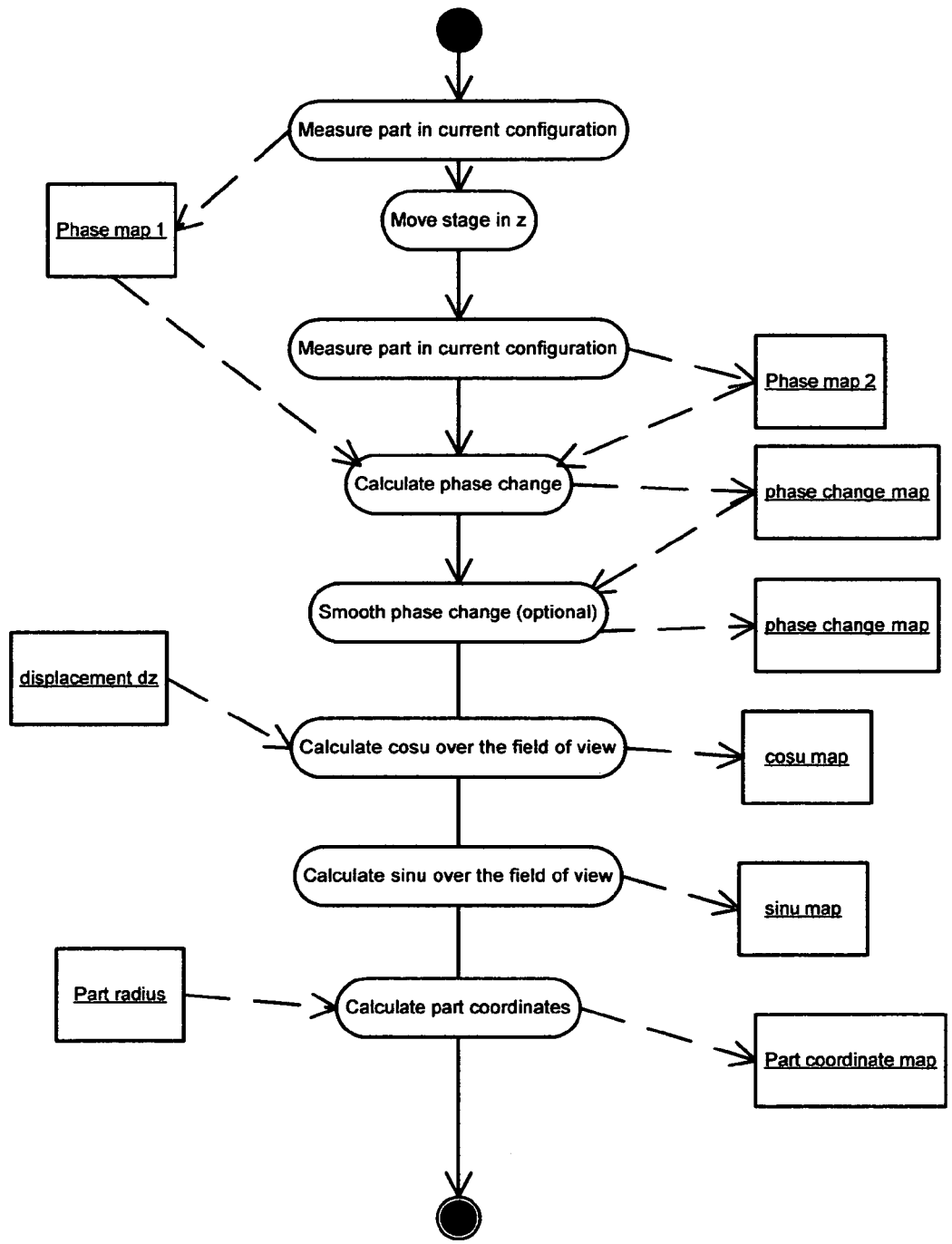
FIG. 3 is a control and object flow chart used in connection with mapping with a spherical cavity with motion along only the z-axis.

For an overview of this procedure, reference may be had to the flow chart (or activity diagram) shown in FIG. 3 which shows the various steps in the method along with the results of the steps and their subsequent use in other steps.

EXAMPLE B

Spherical Cavity, x,y-Motion Only

Example A described the simplest case using an axial motion along only the system axis and described the basic idea of the method. It is obvious that measuring cos u and then calculating sin u is not a good measurement when u becomes small, that is, for pixels close to the optical axis. Here u only enters the equations quadratically. For a good measurement, a linear relationship would be preferable.

This is easily achieved by displacing the part laterally in two degrees of freedom, namely once along the x-axis using the displacement $\delta x$, and a second time using a y-displacement of $\delta y$.

In this, the change in phase is with good approximation described as the scalar product between the probe motion (x or y, respectively) and the probe ray under consideration. Please refer again to FIG. 2. For the coordinates shown in the FIG. 2, this means that the phase difference with respect to the base position is given by:

$$DX = \delta x \sin u \cos \theta$$

$$DY = \delta y \sin u \sin \theta \quad \text{(Eq. 4)}$$

Here again, u is the aperture angle at the point of interest on the surface, DX and DY is half the phase change that was measured on the camera, and $\theta$ is the azimuthal angle measured in the x-y-plane. Assuming an orthogonal imaging system that preserves lateral angles, $\theta$ can be directly calculated using the pixel coordinates themselves.

Now assuming that the actual displacements $\delta x$ and $\delta y$ are known using external sensors, the numerical aperture of the ray in this configuration is easily determined by using the following relation:

$$\sin u = \sqrt{\left(\frac{DX}{\delta x}\right)^2 + \left(\frac{DY}{\delta y}\right)^2} \quad \text{(Eq. 5)}$$

Please note that this procedure linearly measures the numerical aperture for each pixel and thus delivers a map of cavity apertures on the pixel raster.

As in the previous example, coordinates on the surface can be calculated provided the radius of the part under test is known with sufficient precision. The relations for doing so are:

$$x = \frac{DX}{\delta x} R$$

$$y = \frac{DY}{\delta y} R \quad \text{(Eq. 6)}$$

$$h = R \sin u$$

With an asphere, the required coordinates can be calculated from the known theoretical relationship between the numerical aperture and the lateral surface height h.

Figure 4:
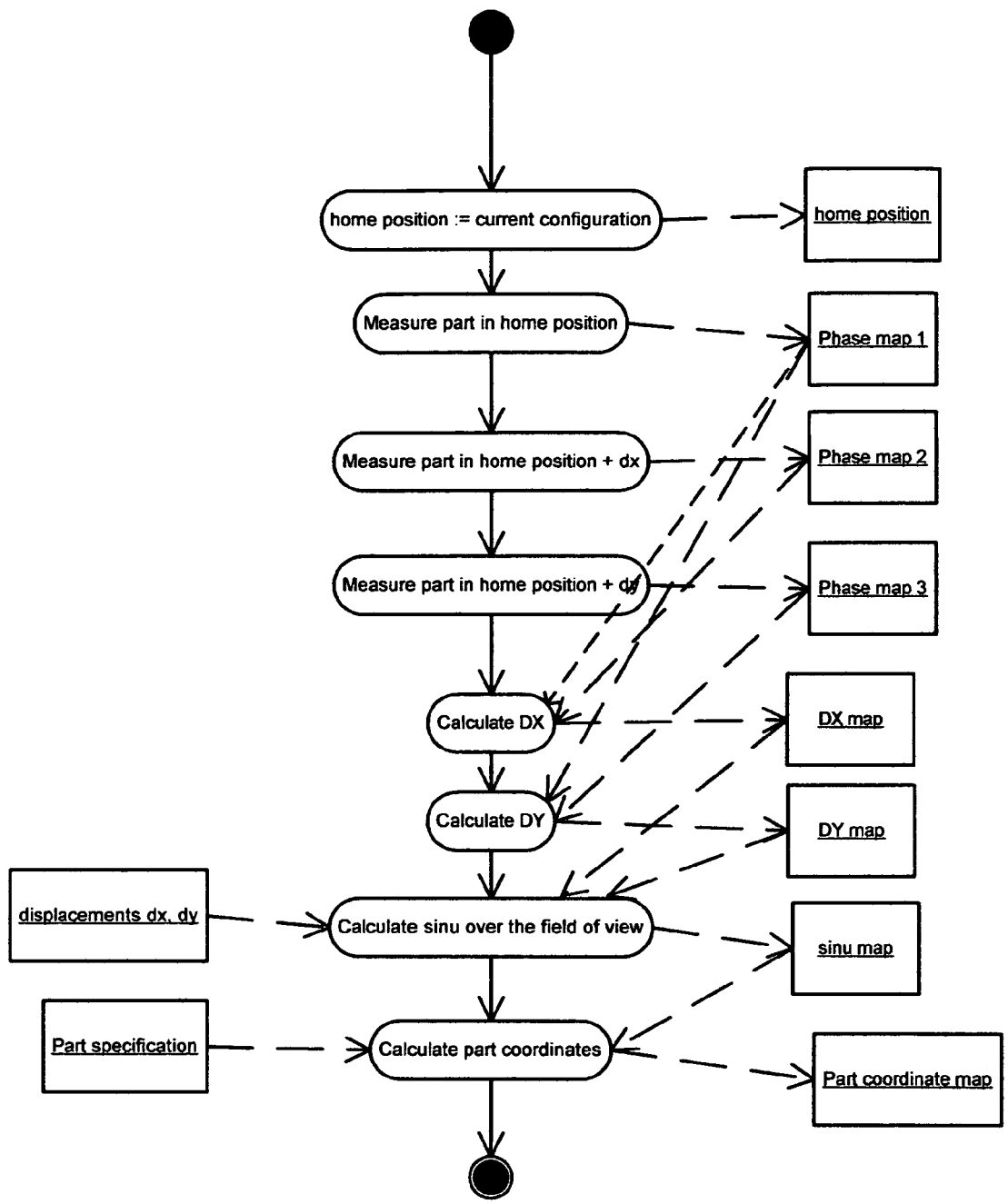
FIG. 4 is a control and object flow chart used in connection with mapping with a spherical cavity with motion along the x and y-axes.

If the actual displacements are not known from external sensors, it is again possible to get these numbers from the measurement itself. All that is needed is to have fiduciaries in the field of view that are known a priori. The simplest approach uses a sharp mask that labels the boundary of the part. If the diameter of this mask is known and the mask is known to be centered on the part, the equation h=R sin u can be used to determine sin u at the boundary of the part. Then, it is easy again to get $\delta x$ and $\delta y$ from the phase changes observed along the part boundary. After this step, the distortion inside the field of view can be determined as described in the previous section. FIG. 4 shows the steps for carrying out the method of this example. As seen, FIG. 4 is an activity diagram showing both the control and object flow throughout the procedure described above.

General Method

Before describing more complex applications, it is worthwhile summarizing the general methodology underlying the examples described so far. The part under test, which is assumed to be a rigid body, can be moved in one to six degrees of freedom in three-dimensional space. Applying a terminology commonly used in Mechatronics, the device that moves the part around and measures its position in all degrees of freedom is referred to as a manipulator stage, or simply the part manipulator.

It is preferable and more optimal when the manipulator incorporates measurement or feedback loops, that is, it both provides the motion and delivers sensor values for the actually reached position in space. Then, the actual displacements $\delta x$, $\delta y$, $\delta z$, $\delta rx$, $\delta ry$, and $\delta rz$ can be obtained from a transformation of the external sensor data. Here $\delta rx$, $\delta ry$, and $\delta rz$ stand for small angular displacements about the x, y, and z-axis, respectively. If external sensor data are not available, it is also possible to determine these values from the phase maps themselves. Concrete examples for how to do this were given in the explanations for Examples A and B already.

For determining the coordinates, the part under test is now measured in at least 2 different positions (cf. case study A). First, the part is measured in a base position, which is usually defined as the position with the smallest fringe density. Then the part is moved in space using the manipulator acting on one or more degrees of freedom at a time. The part is re-measured there and the result is stored. After having collected at least one measurement for each degree of freedom under consideration, the part coordinates are calculated using the differences of the various phase maps with respect to the base position. FIG. 4 shows a generalized control and object flow chart used in connection with mapping with a spherical or aspherical cavity with motion along one or more of six possible degrees of freedom. In the special case of Example A, the cos u map is added prior to determining the sin u map.

EXAMPLE C

Spherical Cavity, x,y,z-Motion

In principle, the approach described under Example B is sufficient to get the coordinates on a part if the manipulator commands (x,y)-motions precisely. In the following, a refinement of the method that is important for practical reasons is discussed.

Consider again a spherical cavity, but this time with a manipulator capable of manipulating the x, y, and z-degrees of freedom. Here, the following relationships hold:

$DX = \delta x \sin u \cos \theta$ $DY = \delta y \sin u \sin \theta$ $DZ = \delta z \cos u$ (Eq. 7)

The instrument measures the phase map differences DX, DY and DZ, and the manipulator reports back measured displacements $\delta x$, $\delta y$ and $\delta z$. This is true in principle but, in practice, the manipulator cannot usually provide a pure x-shift, a pure y-shift or a pure z-shift with ultimate perfection. If a pure x-shift is commanded, for example, there may still be small motion components in the y- and z-direction as well.

Now consider the case where the external feedback from the manipulator measurement loop is better than the actual positioning of the system. In this case, DX, DY and DZ can still be reconstructed with as good a precision as the measurement allows, even if the positioning is not as good. This can be achieved algorithmically as will be shown. And, this process of determining DX, DY, and DZ from impure but accurately measured x-, y- and z-motions can be conveniently referred to as "reaction-separation."

Suppose the part under test was measured, besides the base position, in three more positions with predominant displacements in x, y and z, respectively. Then the three phase map differences with respect to the base position are given by:

$D_1(x_p, y_p) = \delta x_1 DX(x_p, y_p) + \delta y_1 DY(x_p, y_p) + \delta z_1 DZ(x_p, y_p)$ $D_2(x_p, y_p) = \delta x_2 DX(x_p, y_p) + \delta y_2 DY(x_p, y_p) + \delta z_2 DZ(x_p, y_p)$ $D_3(x_p, y_p) = \delta x_3 DX(x_p, y_p) + \delta y_3 DY(x_p, y_p) + \delta z_3 DZ(x_p, y_p)$ (Eq. 8)

In these equations, $x_p$ and $y_p$ denote coordinates on the camera and the $\delta$-quantities are again the displacements in the cavity. Of course, the manipulator is assumed to provide good motion in the sense that $\delta x_1 >> \delta y_1, \delta z_1$ $\delta y_2 >> \delta x_2, \delta z_2$ $\delta z_3 >> \delta x_3, \delta y_3$ This again states nothing other than that the three motions should be carried out predominantly in x, y and z, respectively, and that the measurement feedback is more accurate than the positioning.

The set of three equations shown in Eq. 8 can be interpreted as a set of three independent linear equations for the unknown displacement reactions DX, DY and DZ for each pixel:

$$\begin{pmatrix} \delta x_1 & \delta y_1 & \delta z_1 \\ \delta x_2 & \delta y_2 & \delta z_2 \\ \delta x_3 & \delta y_3 & \delta z_3 \end{pmatrix} \begin{pmatrix} DX(x_p, y_p) \\ DY(x_p, y_p) \\ DZ(x_p, y_p) \end{pmatrix} = \begin{pmatrix} D_1(x_p, y_p) \\ D_2(x_p, y_p) \\ D_3(x_p, y_p) \end{pmatrix}$$ (Eq. 9)

So in the software, the so-called "Reaction-Separator" runs through all the pixels and for each pixel solves this set of linear equations (Eq. 9) and writes the result into the three reaction maps DX(xp,yp), DY(xp,yp) and DZ(xp, yp).

After this step, the numerical apertures on each pixel and the part coordinates associated with each pixel can be calculated exactly as described in Example B and the corresponding flow chart of FIG. 4.

EXAMPLE D

Spherical Cavity, rx,ry-Motion

Instead of using x and y shifts to measure sin u in a spherical cavity, it is also possible to use small rotations about the x- and y-axis to achieve the same thing. The rotational degree of freedom associated with x is labeled rx and the one associated with y is labeled as ry. If the pivot point is the apex of the part, the relevant equations are the following:

$DRX = \delta rx \cdot R \cdot \sin u \cdot \cos\theta$ $DRY = \delta ry \cdot R \cdot \sin u \cdot \sin\theta$ (Eq. 10)

And the coordinates are then given by:

$$x = \frac{DRX}{\delta rx}$$ (Eq. 11)

$$y = \frac{DRY}{\delta ry}$$

$$h = R\sin u = \sqrt{x^2 + y^2}$$

The corresponding flow chart would be a variant of FIG. 4.

EXAMPLE E

Spherical Cavity, Combination of All Possible Motion

Of course, it is also possible to command displacements in all possible directions and then solve for the coordinates on the part. This leads to over-determined equation systems, which can then be solved by least-squares method which, in turn, leads to more accurate results.

A modified version of the reaction-separation technique described in Example C can be used to first find the DX, DY, DZ, DRX, DRY. This is useful if the manipulator has better measurement capabilities than it can position the part.

EXAMPLE F

Plano Cavity, rx,ry-Motion

Figure 5:
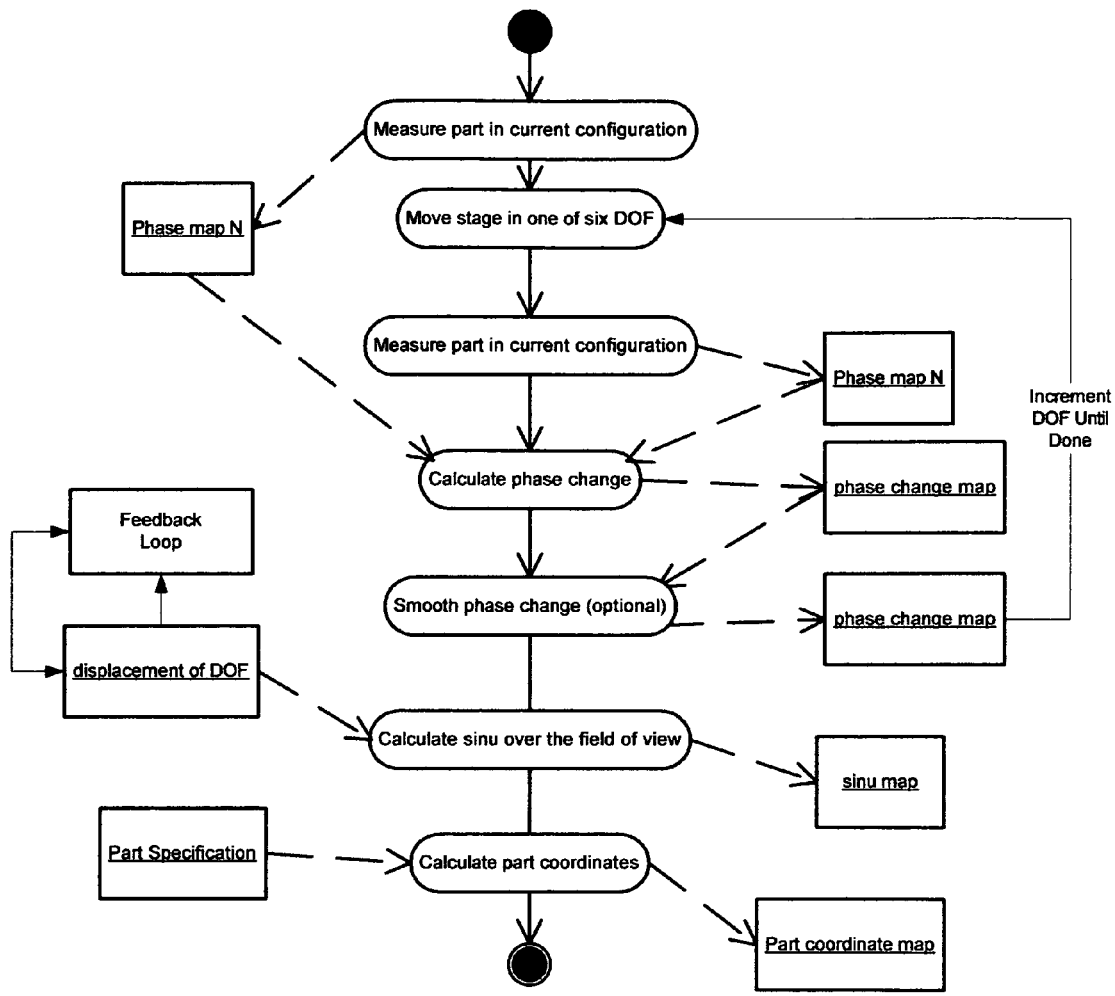
FIG. 5 is a generalized control and object flow chart used in connection with mapping with a spherical cavity with motion along one or more of six possible degrees of freedom.

The method is also applicable to piano cavities use is made of rx and ry as the degrees of freedom (piano cavities do not react on in-plane x-y-shifts). In this case, DX and DY are proportional to the distance of the point P to the pivot point. That is, if the pivot point is in the origin of the coordinate system, then DX and DY are directly proportional to xp and yp (Again refer to the flow charts of FIGS. 4 and 5).

EXAMPLE G

Aspheric Test Parts

Aspheric test parts are treated just like spherical test parts as discussed before. It is possible to measure sin u in exactly the same way. The only thing that changes is that in this case the lateral height h is no longer given by R * sin u. Instead, the nominal profile of the asphere under test is used and the relationship between h and sin u is numerically inverted.

Having described the invention in detail, it will be appreciated that it has the following advantages:

(1). External measurements of the coordinate mapping become obsolete.
(2). Coordinates are automatically delivered over the same sampling raster as the phase data themselves.
(3). For each pixel, the numerical aperture in the cavity can be determined. In all cases where theoretical profiles can be predicted as a function of the numerical aperture, this allows to directly subtract a mathematical model from the data without taking into account errors introduced by the imaging system. Modeling the cavity becomes much simpler.
(4). The cosine of the aperture angle for each pixel can be retrieved as well and can be used to compensate for the geometry effect in mechanical phase shifting.
(5). The metrology chain or the transfer chain within the fabrication cycle of high precision optical surfaces becomes shorter.

Having described the embodiments and operation of the invention, variations will occur to others based on its teachings. Therefore, it is intended that all such variations be within the scope of the invention.

What is claimed is:

1. An interferometric in situ calibration method for mapping the correspondence between pixel coordinates and part locations where measurements of the part are to be taken, said interferometric in situ calibration method comprising the steps of:
    mounting a part to be tested for precise movement in one to six degrees of freedom in three-dimensional space within an interferometer cavity;
    precisely moving the part prior to its actual measurement in at least one of the six possible degrees of freedom between a base position and at least one other position;
    generating maps of the difference in phase between individual pixels and their corresponding part position as measured between the base position and all other positions;
    calculating a map of u, the angular direction from points on the part to their corresponding pixel;
    determining a map of sin u from the map of u;
    determining from the map of sin u the lateral location to each point on the part; and
    correlating each pixel coordinate with its corresponding lateral location of each point on the part.

2. The interferometric in situ calibration method of claim 1 wherein said interferometer cavity is selected from the group consisting of Fizeau, Mirau, Twyman-Green, Michelson, Linnik, Grazing incidence, and Shearing interferometers.

3. The interferometric in situ calibration method of claim 1 wherein interferometer cavity measures objects selected from the group consisting of spheres, aspheres, and flats.

4. The interferometric in situ calibration method of claim 1 wherein said at least one degree of freedom is displacement along only the z-axis and wherein the phase difference between a pixel and its corresponding part location in the base-and-any other displaced-position is given by $\Delta\Phi = 2\delta\ z \cos u$.

5. The interferometric in situ calibration method of claim 3 wherein said sinu map is calculated using the trigonometric identity, $\sin u = \sqrt{1 - \cos^2 u}$.

6. The interferometric in situ calibration method of claim 5 wherein the lateral location of each point on the part is h, where h is given by $h = R \sin u$ where R is the radius of the surface under test.

7. The interferometric in situ calibration method of claim 1 further including the step of precisely moving the part in six possible degrees of freedom between a base position and at least one other position wherein displacements of said six degrees of freedom are given by the actual displacements $\delta x$, $\delta y$, $\delta z$, $\delta rx$, $\delta ry$, and $\delta rz$ obtained from a transformation of external sensor data where $\delta rx$, $\delta ry$, and $\delta rz$ are small angular displacements about the x, y, and z-axis, respectively.

8. The interferometric in situ calibration method of claim 1 wherein the displacement of said part is effected with a precise mechanical manipulator provided with sensors for generating feedback signals to precisely maintain the position of a part after it has been commanded to move.

9. The interferometric in situ calibration method of claim 1 wherein the movements of the part and all calculations are carried out with the aid of a programmed processor.

10. An interferometric apparatus for calibrating in situ the correspondence between pixel coordinates and part locations where measurements of the part are to be taken, said interferometric apparatus comprising:
    an interferometer cavity;
    a precision micromanipulator for mounting a part to be tested for precise movement in one to six degrees of freedom in three-dimensional space within said interferometer cavity;
    a controller for precisely moving the part prior to its measurements in at least one of the six possible degrees of freedom between a base position and at least one other position;
    a camera and detector comprising an array of pixels of known coordinates for recording interferograms from said cavity for different positions of said part; and
    a processor for:
    (a) generating maps of the difference in phase between individual pixels and their corresponding points on the part as measured between the base position and all other positions of the part;
    (b) calculating a map of u, the angular direction from points on the part to their corresponding pixel;
    (c) calculating a map of sin u;
    (d) determining from the map of sin u the lateral location to each point on the part; and
    (e) correlating each pixel coordinate with its corresponding lateral location of each point on the part.

11. The interferometric apparatus of claim 10 wherein said interferometer cavity is selected from the group consisting of Fizeau, Mirau, Twyman-Green, Michelson, Linnik, Grazing incidence, and Shearing interferometers.

12. The interferometric apparatus of claim 10 wherein said interferometer cavity measures objects selected from the group consisting of spheres, aspheres, and flats.

13. The interferometric apparatus of claim 10 further including sensors for said precision mechanical micromanipulator to provide feedback signals to precisely maintain the position of a part after it has been commanded to move.

14. An interferometric in situ calibration method for mapping the correspondence between pixel coordinates and part locations where measurements of the part are to be taken, said interferometric in situ calibration method comprising the steps of:
- mounting a part to be tested for precise movement in one to six degrees of freedom in three-dimensional space within an interferometer cavity;
- precisely moving the part prior to its measurement in at least one of the six possible degrees of freedom between a base position and at least one other position;
- generating maps of the difference in phase between individual pixels and their corresponding part position as measured between the base position and all other positions;
- calculating a map of u, the angular direction from points on the part to their corresponding pixel;
- calculating a map of sin u;
- determining from the map of sin u the lateral location to each point on the part; and
- correlating each pixel coordinate with its corresponding lateral location of each point on the part wherein said at least one degree of freedom consists of motion along only the x and y axes where:

$$DX = \delta x \sin u \cos \theta$$

$$DY = \delta y \sin u \sin \theta$$

where u is the angle at the point of interest on the surface, DX and DY is half the phase change that was measured on the camera, and θ is the azimuthal angle measured in the x-y-plane, and where θ can be directly calculated using the pixel coordinates themselves.

15. The interferometric in situ method of claim 14 wherein $$\sin u = \sqrt{\left(\frac{DX}{\delta x}\right)^2 + \left(\frac{DY}{\delta y}\right)^2}$$

and the part locations are given by $$x = \frac{DX}{\delta x} R$$

$$y = \frac{DY}{\delta y} R$$

$$h = R \sin u$$

where R is the radius of the part.

16. An interferometric in situ calibration method for mapping the correspondence between pixel coordinates and part locations where measurements of the part are to be taken, said interferometric in situ method comprising the steps of:
- mounting a part to be tested for precise movement in one to six degrees of freedom in three-dimensional space within an interferometer cavity;
- precisely moving the part prior to its measurement in at least one of the six possible degrees of freedom between a base position and at least one other position;
- generating maps of the difference in phase between individual pixels and their corresponding part position as measured between the base position and all other positions;
- calculating a map of u, the angular direction from points on the part to their corresponding pixel;
- calculating a map of sin u;
- determining from the map of sin u the lateral location to each point on the part; and
- correlating each pixel coordinate with its corresponding lateral location of each point on the part wherein said at least one degree of freedom consists of motion along only the x and y axes wherein said part is displaced along x, y, and z axis and wherein the phase differences are given by:

$$DX = \delta x \sin u \cos \theta$$

$$DY = \delta y \sin u \sin \theta$$

$$DZ = \delta z \cos u$$

where u is the angle at the point of interest on the surface, DX and DY is half the phase change that was measured on the camera, and θ is the azimuthal angle measured in the x-y-plane, and where θ can be directly calculated using the pixel coordinates themselves.

17. An interferometric in situ method for mapping the correspondence between pixel coordinates and part locations where measurements are taken, said interferometric in situ method comprising the steps of:
- mounting a part to be tested for precise movement in one to six degrees of freedom in three-dimensional space within an interferometer cavity;
- precisely moving the part in at least one of the six possible degrees of freedom between a base position and at least one other position;
- generating maps of the difference in phase between individual, pixels and their corresponding part position as measured between the base position and all other positions;
- calculating a map of u, the angular direction from points on the part to their corresponding pixel;
- calculating a map of sin u;
- determining from the map of sinu the lateral location to each point on the part; and
- correlating each pixel coordinate with its corresponding lateral location of each point on the part wherein said at least one degree of freedom consists of motion along only the x and y axes wherein the part is displaced by small angular rotations about the x and y-axes where the phase differences are given by:

$$DRX = \delta rx \cdot R \cdot \sin u \cdot \cos \theta$$

and the coordinates are given by:

$$DRY = \delta ry \cdot R \cdot \sin u \cdot \sin \theta$$

$$x = \frac{DRX}{\delta rx}$$

$$y = \frac{DRY}{\delta y}$$

-continued $$h = R\sin u = \sqrt{x^2 + y^2}$$

where u is the angle at the point of interest on the surface, DX and DY is half the phase change that was measured on the camera, and θ is the azimuthal angle measured in the x-y-plane, and where θ can be directly calculated using the pixel coordinates themselves.

18. An interferometric in situ method for mapping the correspondence between pixel coordinates and part locations where measurements are taken, said interferometric in situ method comprising the steps of:
mounting a part to be tested for precise movement in one to six degrees of freedom in three-dimensional space within an interferometer cavity;
precisely moving the part in at least one of the six possible degrees of freedom between a base position and at least one other position;
generating maps of the difference in phase between individual pixels and their corresponding part position as measured between the base position and all other positions;
calculating a map of u, the angular direction from points on the part to their corresponding pixel;
calculating a map of sin u;
determining from the map of sin u the lateral location to each point on the part; and
correlating each pixel coordinate with its corresponding lateral location of each point on the part wherein said cavity is piano-piano and the part is tilted and tipped about the x and y axes.

19. An interferometric in situ method for mapping the correspondence between pixel coordinates and part locations where measurements are taken, said interferometric in situ method comprising the steps of:
mounting a part to be tested for precise movement in one to six degrees of freedom in three-dimensional space within an interferometer cavity;
precisely moving the part in at least one of the six possible degrees of freedom between a base position and at least one other position;
generating maps of the difference in phase between individual pixels and their corresponding points on the part as measured between the base position and all other positions;
calculating a map of u, the angular direction from points on the part to their corresponding pixel;
determining a map of sin u from the map of u;
determining from the map of sin u the lateral location to each point on the part; and
correlating each pixel coordinate with its corresponding lateral location of each point on the part,
wherein the part is displaced by small angular rotations about the x and y-axes where the phase differences are given by:

$$DRX = \delta ry \cdot R \cdot \sin u \cos \theta$$

and the coordinates are given by:

$$DRY = \delta ry \cdot R \cdot \sin u \cdot \sin \theta$$

$$x = \frac{DRX}{\delta rx}$$
$$y = \frac{DRY}{\delta y}$$
$$h = R\sin u = \sqrt{x^2 + y^2}$$

where θ is the azimuthal angle measured in the x-y-plane, and where θ can be directly calculated using the pixel coordinates themselves and δrx, and δry, are small angular displacements about the x and y-axis, respectively.

20. An interferometric in situ method for mapping the correspondence between pixel coordinates and part locations where measurements are taken, said interferometric in situ method comprising the steps of:
mounting a part to be tested for precise movement in one to six degrees of freedom in three-dimensional space within an interferometer cavity;
precisely moving the part in at least one of the six possible degrees of freedom between a base position and at least one other position;
generating maps of the difference in phase between individual pixels and their corresponding points on the part as measured between the base position and all other positions;
calculating a map of u, the angular direction from points on the part to their corresponding pixel;
determining a map of sin u from the map of u;
determining from the map of sin u the lateral location to each point on the part; and
correlating each pixel coordinate with its corresponding lateral location of each point on the part,
wherein said cavity is plano-plano and the part is tilted and tipped about the x and y axes.

* * * * *